Nov. 20, 1951  H. H. TALBOYS ET AL  2,575,535
SPIKE HAMMER
Filed May 16, 1946  7 Sheets-Sheet 1

Fig.1

Inventors
Henry H. Talboys
Helmer E. Erickson
by Parker & Carter
Attorneys Nov. 20, 1951  H. H. TALBOYS ET AL  2,575,535

SPIKE HAMMER

Filed May 16, 1946  7 Sheets-Sheet 2

Inventor
Henry H. Talboys
Helmer E. Erickson
by Parker & Carter
Attorneys Patented Nov. 20, 1951

2,575,535

UNITED STATES PATENT OFFICE 2,575,535

SPIKE HAMMER

Henry H. Talboys and Helmer E. Erickson, Milwaukee, Wis., assignors to Nordberg Manufacturing Co., Milwaukee, Wis., a corporation of Wisconsin Application May 16, 1946, Serial No. 670,129

14 Claims. (Cl. 104—17)

This invention relates to an improvement in power hammers and has for one purpose to provide a spike hammer adapted to drive railway spikes.

Another purpose is to provide a spike hammer movable along the rails of a track.

Another purpose is to provide a spike hammer adapted for use with manually operated spike holders, whereby the spikes are manually held in driving position.

Another purpose is to provide an improved power plant for spike hammers.

Another purpose is to provide a spike hammer with improved boom means.

Another purpose is to provide an improved spike hammer drive.

Other purposes will appear from time to time in the course of the specification and claims.

The invention is illustrated more or less diagrammatically in the accompanying drawings wherein.

Like parts are indicated by like symbols throughout the specification and drawings.

Referring to the drawings 1 generally indicates the ballast along which a plurality of ties 2 are laid. 3 indicate a plurality of tie plates having spike apertures 4 therein. 5 are the track rails, shown as resting on the tie plates 3 and abutting against the tie plate flanges 6.

Figure 2:
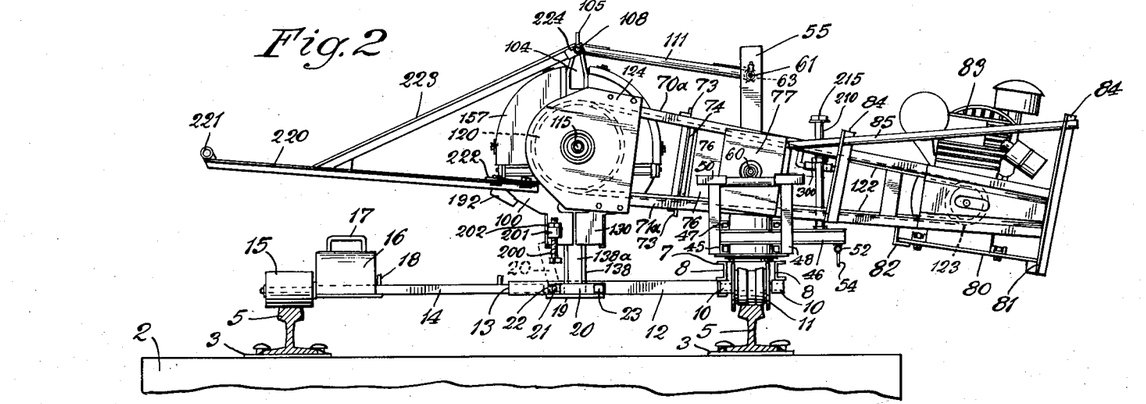
Figure 2 is a side elevation.

A main frame or under carriage is provided which rides on the two rails of the track, and which serves as a support for the below described spike hammer or spike driver structure. The under frame includes a longitudinally extending frame portion 7 including parallel side frame members 8, 8, suitably connected transversely as at 9, and having downwardly extending bearings or flanges 10 within which flanged rail engaging wheels or rollers 11 are journaled. Extending laterally from the frame portion 7 is a transverse support 12, shown as a hollow rectangular beam. It is open at its outer end as at 13 to receive the telescopic member 14 which carries at its outer end any suitable rail engaging roller 15 as shown in Figure 2 with any suitable insulating means not herein shown. If desired, and under some circumstances, a removable counterweight 16, with its handle 17, may be positioned on the member 14, guided or spotted for example by any suitable upward extension or flange 18. The member 12 is shown as having a laterally extending plate 19 the purpose of which will later appear. It has associated therewith a locking bar or plate 20, pivoted as at 21 to lugs 22, and adapted to rest, when in the locking position, against the securing lug or flange 23, upwardly extending from the plate 19.

Figure 4:
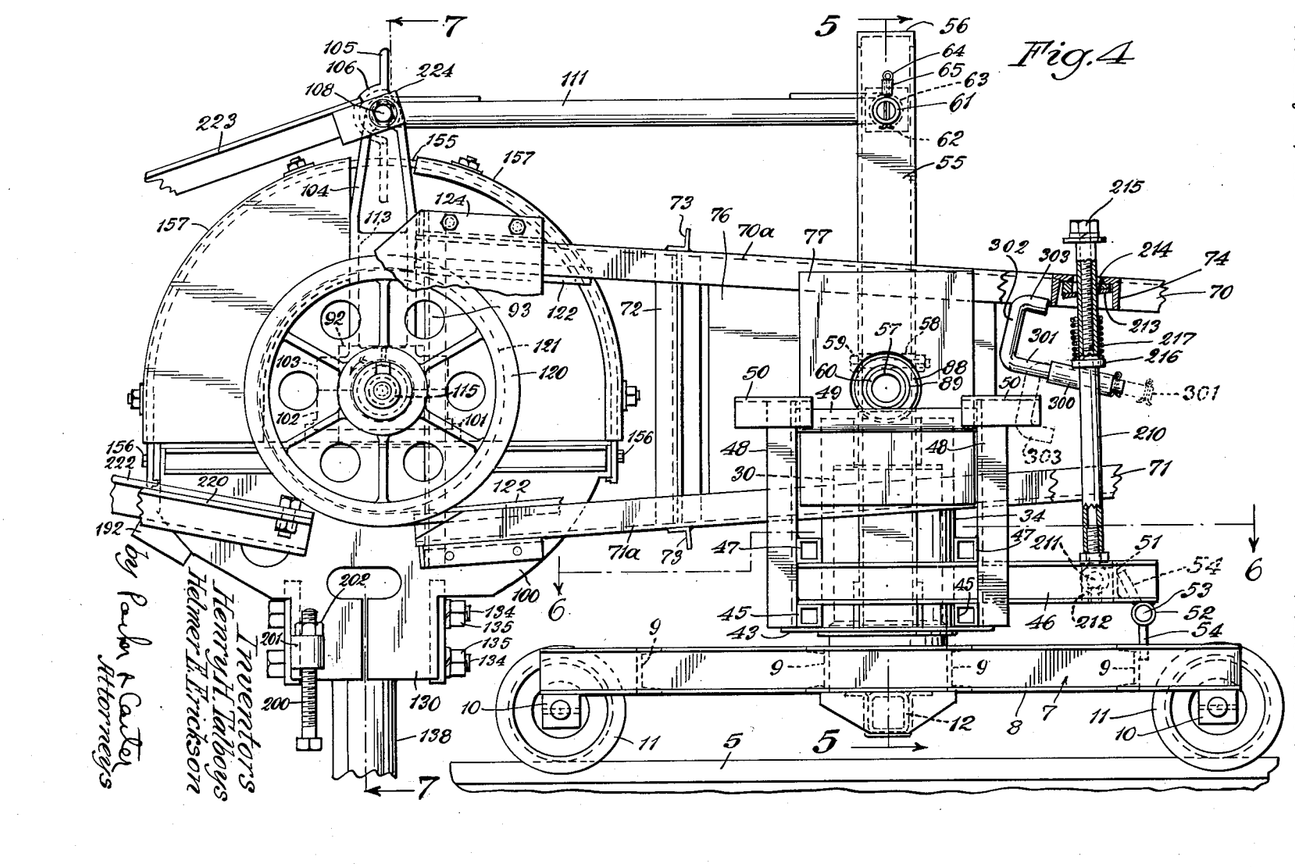
Figure 4 is a vertical longitudinal section with parts omitted.
Figure 5:
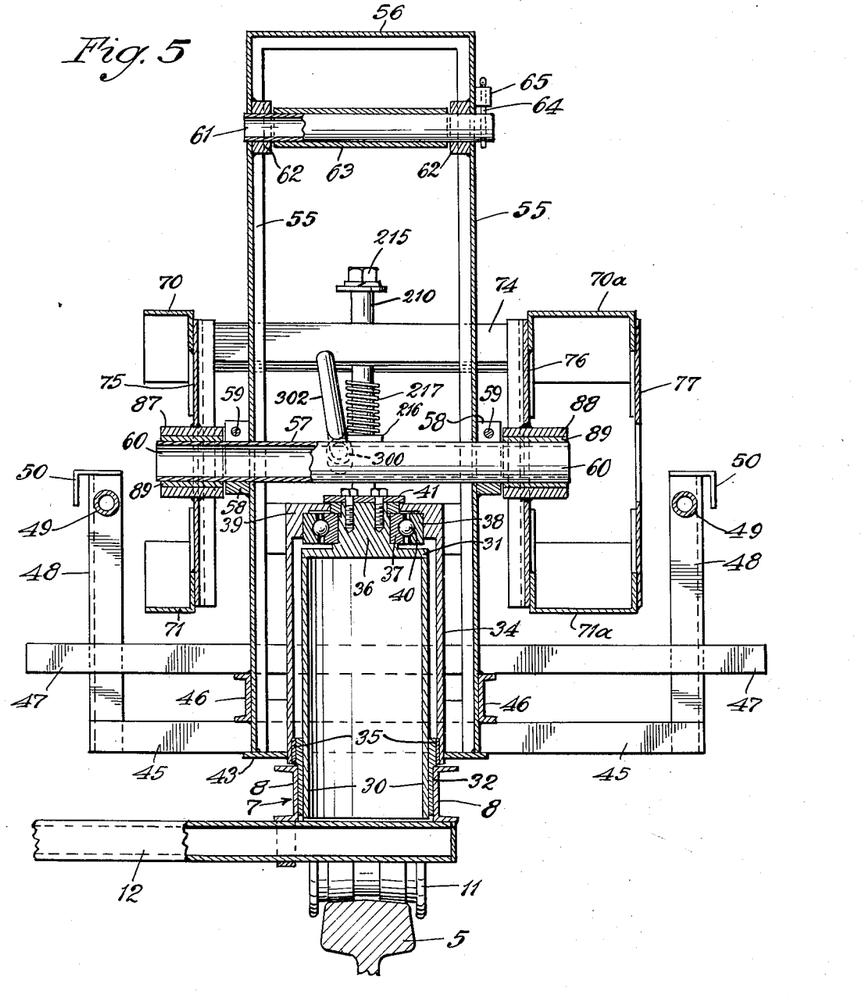
Figure 5 is a section on the line 5—5 of Figure 4.

Built up on the side frame members 8 is an upper carriage portion, which moves unitarily with the lower carriage or truck portion 7. Mounted at its lower end between the side frame members or channels 8 is a cylindrical member 30 having a closed flat top 31. The member 30 with any suitable outside bottom sleeve 32 is welded or otherwise secured to the side frames 8 in the position in which it is shown, for example, in Figure 5. Surrounding the member 30 is an outer cylindrical sleeve 34 having at its lower edge an annular bearing connection 35 which surrounds the lower sleeve portion 32. On the top 31 is a turntable structure which includes a generally cylindrical abutment 36 carrying the inner roller or ball race 37. 38 indicates an outer race which supports the annular ring 39 from which the sleeve 34 depends. Thus the rotatable outer sleeve 34 may rotate concentrically with the fixed inner member 30. It will be observed as in Fig. 5 that the races 37 and 38 are so related to the balls 40 as to serve as a support for the below described upper structure. 41 is any suitable holding disc which overlies the inner edge of the annular member 39, and holds the top revolving frame on the main frame. 43 illustrates an annular flat ring secured to and extending outwardly from the lower edge portion of the member 34. Resting upon the member 43 at opposite sides of the sleeve 34 are a pair of square hollow tubular members 45. Extending at generally right angles thereto and resting upon them are a pair of channel members 46. Above the channel members is another pair of transversely extending square hollow members 47, aligned above the members 45 but somewhat longer, as will be clear from Fig. 5. Upwardly extending from the end of the members 45, and secured to the members 47 are vertical elements 48 herein shown as angles which are connected by longitudinally extending rods or pins 49 the ends of which have overlying angles 50. The ends of the members 46 are connected by a transverse brace shown as an angle 51. Extending below it is a bearing 52 receiving a pivot pin 53 to which is secured a stop member 54 which, when in the lower position of Fig. 4, drops between the side frame members 8 and permits only a limited rotation of the below described superstructure and boom, about the vertical axis of the support 30. When the member 54 is moved into the upper position in which it is shown in Fig. 4 the boom structure and superstructure can be swung to position transversely of the rails. Mounted between the channel members 46 and abutting against the bottom ring 43 is an upright yoke having parallel opposite channel members 55 connected by a top piece 56. Extending across the side frame members 55 is a bearing tube 57 which may be clamped in the split supporting sleeves 58 with clamping bolts 59. The parts are proportioned to provide an outwardly extending bearing end 60 at each end of the member 57. 61 is a hollow cross shaft or tube extending between an upper portion of the side members 55. Its ends are secured in blocks 62 and it is surrounded by a rotatable sleeve 63, the purpose of which will later appear. 64 is any suitable locking pin or cotter which passes through a lug 65 and prevents unintended endwise removal of the tube or shaft 61.

Figure 3:
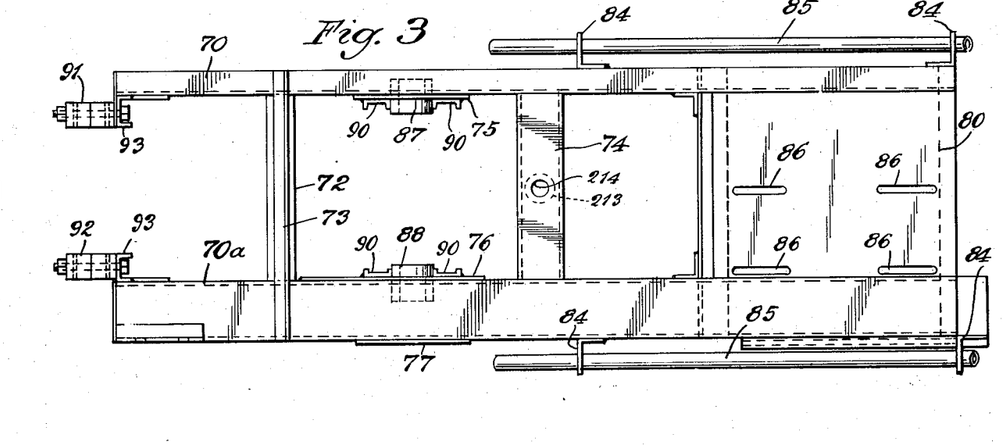
Figure 3 is a partial plan view illustrating the boom structure.

Supported rotatably on each of the end portions 60 is one side of the below described boom structure illustrated for example in Fig. 3. The boom structure includes at each side a pair of side frame members 70, 71 which converge rearwardly, as shown for example in Fig. 4. The members 70, 71 are connected intermediate their ends by any suitable connecting supports 72 and are also additionally cross connected by any suitable connecting supports 73 and 74. 75, 76 and 77 indicate vertical connecting plates, 75 being at one side of the boom and 76 and 77 being at the other, as will be clear from Fig. 3. 80 is any suitable engine platform, connected to the boom structure by any suitable generally upright supports 81 and by a transversely extending angle 82. 83 generally indicates any suitable motor structure the details of which do not of themselves form part of the present invention. 84 are outer, upwardly extending angles on the boom through which may pass any suitable longitudinally extending rods or handle bars 85. 86 are any suitable slots to which the engine structure 83 may be adjustably secured, for example for belt takeup.

87, 88 are bearing sleeves mounted respectively in the plates 75 and 76 and adapted to receive the ends 60 of the cross member 57. 89 are any suitable integral bearing sleeves. 90 are generally vertically extending reinforcing or stiffening channels secured to the plates 75 and 76. At the end of the boom opposite to the engine are secured split bearing sleeves 91 and 92 respectively, which are mounted on channels 93 which extend between the upper and lower boom members 70 and 71.

100 generally indicates a lower portion of a hammer housing. Secured to and extending along the upper edge of this housing portion are longitudinally extending reinforcing members 101. Secured to each of them is a lower portion 102 of a split bearing. Each upper portion 103 of such split bearing has an upwardly extending arm or side frame portion 104, two said portions being connected by a transverse and preferably integral connection 105, which includes a semi-cylindrical portion 106 opened toward the rear of the boom. It also includes bearing sleeves 107 through which extend any suitable pivot pin 108, on which is a sleeve 109 upon which is rotatable a bearing sleeve 110 connected by any suitable connecting structure 111, the opposite end of which is connected to the sleeve 63 shown at the top of Fig. 5. The split bearing portions 102 and 103 are connected by any suitable bolt structures including bolts 112. Each side frame member 104 is provided with a hollow portion 113 which may be filled with waste, and which may retain a lubricant which flows through any suitable feed duct 114 to lubricate the hammer shaft 115 which is rotatable in bearing sleeves 116 retained by split rings 117 which are recessed into the bearing portions 102 and 103. Exterior to the bearing portions 102 and 103 on the shaft 115 are the split bearings 91, 92, of the above described boom structure. 120 indicates any suitable drive wheel with its belt receiving grooves 121 adapted to receive drive belts 122 which extend to any suitable drive pulley 123 of the motor 83.

124 is any suitable belt and pulley guard. It will also be noted that at the inner side of the boom, as shown at the bottom of Fig. 3, the side frame members 70 and 71 may be inwardly widened to form guard channels for the belts 122. This channel is well illustrated at 70a and 71a in Fig. 5. Extending downwardly from the hammer housing portion 100 is a square box 130 in which are positioned spacing plates 131 and an anvil guide support 132 which is inwardly screw threaded as at 133. The structure is held together by transversely extending headed bolts 134 with their securing nuts 135. Screw threaded in the threads 133 is an upper outwardly screw threaded sleeve 136 and a lower outwardly screw threaded sleeve 137. The lower sleeve 137 has a tubular downward extension 138 having an internal bore 139 with a slit bottom extension or recess 140. The upper portion 136 has a noncircular aperture 141 conforming to the outer contour of the anvil head 142. The anvil head has an enlargement 143 adapted to abut against the lower offset surface 144 of the member 136. The member 137 is suitably recessed as at 145 to permit movement of the anvil portion 143. The anvil 143 has a lower stem including cylindrical guide portions 146 and 147 connected by the reduced portion 148. The member 147 may be slightly concave as at 149 to receive the head of any suitable spike 150. It will be understood that the head of the spike 150 may penetrate the socket formed by the reduced portion 140 at the lower end of the anvil guide 138. It will also be understood that the members 136 and 137 are independently adjustable within the sleeve 132. Any suitable key 151 may be employed to prevent undesired relative rotation of the parts. It will also be noted that the anvil top portion 142 has opposite slightly inclined faces 152, 153, the purpose of which will later appear.

Figure 7:
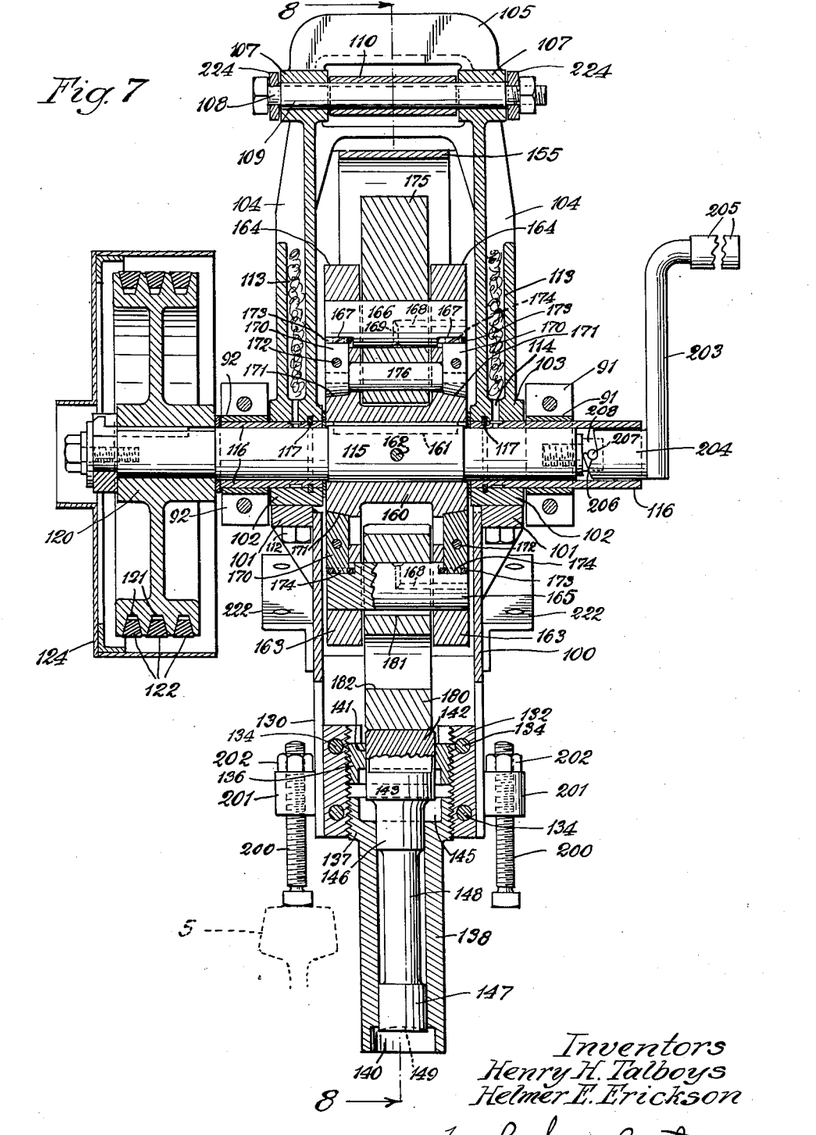
Figure 7 is a section on the line 7—7 of Figure 4.

155 indicates any suitable top housing member or hammer guard which may be removably secured as by bolts 156 and, as shown in Fig. 7, extends between the side members 104 of the hammer supporting yoke. 157 are any suitable channel shaped guards secured to the housing 155.

Figures 8, 9:
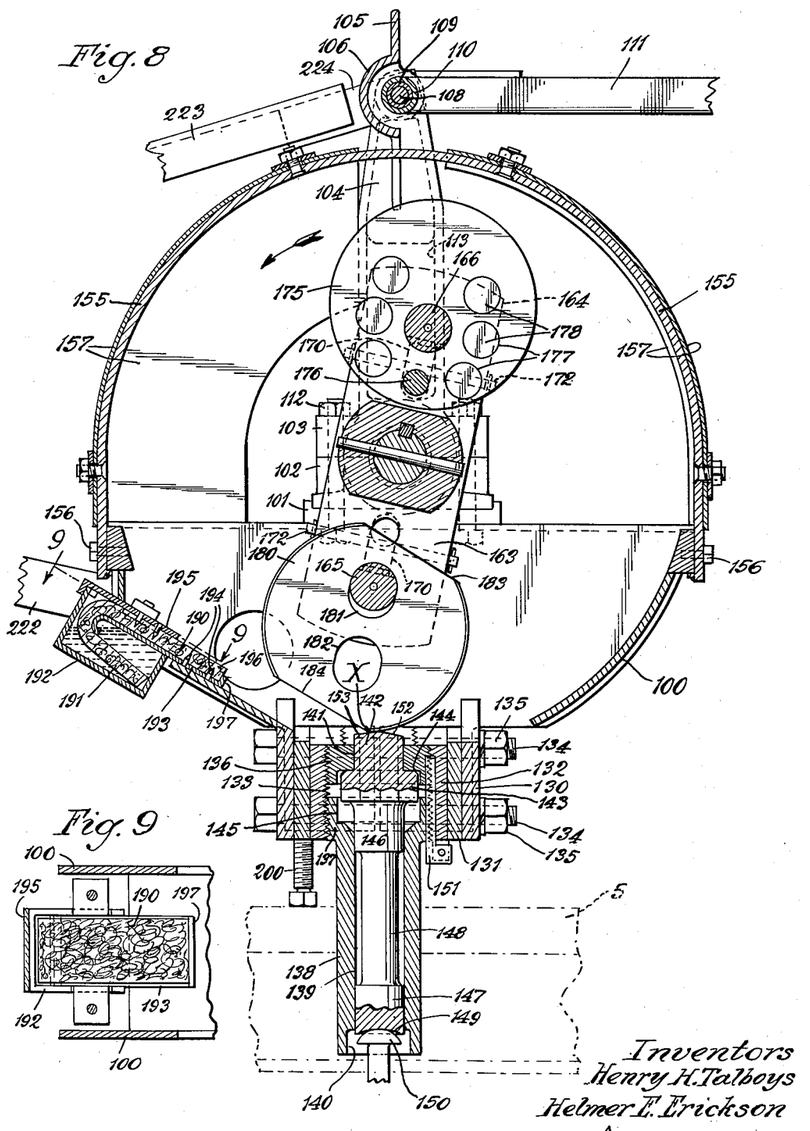
Figure 8 is a section on the line 8—8 of Figure 7.
Figure 9 is a section on the line 9—9 of Figure 8.

The hammer structure proper, which rotates with the shaft 115 includes a hub 160 keyed as at 161 to the shaft 115 and also pin secured as at 162, as will be clear in Figs. 7 and 8. Extending from the hub are diametrically opposed arms 163, 164. Each arm may include separately spaced side plates, the parts being preferably welded together, and formed and connected in a unitary structure. The side portions of the arm 163 are connected by a pivot pin 165, and the arm members 164 are connected by a counterweight pin 166. For convenience the two pins may be identical. Since the pins 165 and 166 are identical they will not be separately described. Referring for convenience to pin 166 as shown in Figs. 7 and 8, it has cutaway end portions 167 at each end and an axial oil channel 168 with a cross or outlet channel 169. The oil feature is important primarily in connection with the use of the pin as a hammer bearing or support. Received in the cutaway end portions 167 are retaining blocks 170 which are recessed into the arm side plates as at 171. They are held in position by any suitable securing pins 172 which pass through the plates 163 and 164 respectively. 173 is any suitable spring retaining abutment surrounding a boss 174 at the upper surfaces of the blocks 170. 175 is a counterweight, in the form of a disc. It may be held against rotation for example by the transversely extending pin 176 which extends into the side plates and is held in position by the retainer blocks 170. The weight 175 is provided with any suitable pockets or apertures 177 which may be filled with lead or other suitable weighting material, as at 178, the amount of such material inserted being determined by the necessity of the particular installation. 180 is a hammer pivoted on the pin 165. It is reversible and is provided with a plurality of elongated apertures 181, 182 which may, selectively, receive the pin 165. The surface of the hammer is oppositely flattened as at 183, 184. It will be understood that when a hammer and counterweight structure is rotated in the direction of the arrow in Fig. 8 the toe of the hammer, as at X, will engage the inclined surface 153 of the anvil 142, and impart a downward impact against the anvil and thus against the spike 150, when the anvil is held in the position in which it is shown in Fig. 8, by being downwardly moved against the head of the spike 150. It is desirable to lubricate the hammer at the head of the impact. The wick 190 includes an end portion 191 extending into an oil box 192; the wick is held against a securing plate 193 with its points or barbs 194 by any suitable securing plates 195. The free part of the wick, as at 196, is wiped by the hammer as the hammer moves toward the anvil. The lower end of the wick which is wiped by the hammer may be retained by the short upwardly extending flange 197 which forms part of the supporting plate 193. The boom may be spaced in relation to the rail, and the downward movement of the anvil guard 138 is limited by adjustable stops 200 which are threaded at each side of the anvil support, into outwardly extending flanges or bosses or ears 201. 202 is any suitable nut adapted to lock the parts in adjusted position. 203 is any suitable crank for starting the motor by rotating the shaft 115. It includes a cranking socket 204 and a handle 205. The socket 204 is formed as at 206 to receive a pin or pins 207 extending outwardly from a reduced end portion 208 of the shaft 115. It will be noted that one of the sleeves 116 is outwardly extended as shown in Fig. 7 to surround the portion 208.

The rotation of the boom structure about its horizontal axis may be limited, as shown in Fig. 4 by the limit pin or rod 210 which is pivoted as at 211 to lugs 212 on the member 51 and which has its upper portion extending through an aperture 214 in the cross channel 74 of the boom. 215 is an adjustable stop, in the form of a bolt and washer, screw threaded into the rod 210. 216 is a lower abutment adapted to receive a spring 217 which may abut against the member 213 at the bottom of the channel member 74. It will be understood that when the parts are in the position shown in Fig. 4 a limited oscillation of the boom structure about its center at the shaft 57 is permitted. The downward movement of the boom may be positively limited by adjusting the stop 215. The spring 217 serves as a cushioning means. It will be understood that the parts are preferably so proportioned that the engine end of the boom is slightly heavier than the hammer end of the boom. Thus the boom, unless positively downwardly moved, will rotate clockwise, with relation to the position of parts shown in Fig. 4 until it is stopped by the spring 217 and lower abutment 216.

In manipulating the device handle means are provided in the form of a boom extension. Referring for example to Fig. 2 the handle members 220 are connected by a cross handle member 221. At the inner end they are connected to angles 222 on the hammer housing 100. 223 are handle supporting struts which are secured as at 224 to the cross pin 108. It will be understood that when the user thrusts down on the handle 221 the hammer structure is lowered. However the relation between the point shaft 108, the shaft 57, the shaft 61 and the shaft 115 maintains the axis of movement of the anvil at all times substantially perpendicular. Thus the anvil always operates against the spike along a substantially vertical axis. It will be further understood that if desired any suitable additional weighting may be applied to the engine platform or the engine end of the boom, in order to maintain the desired loading or relationship between the two ends of the boom.

Figure 6:
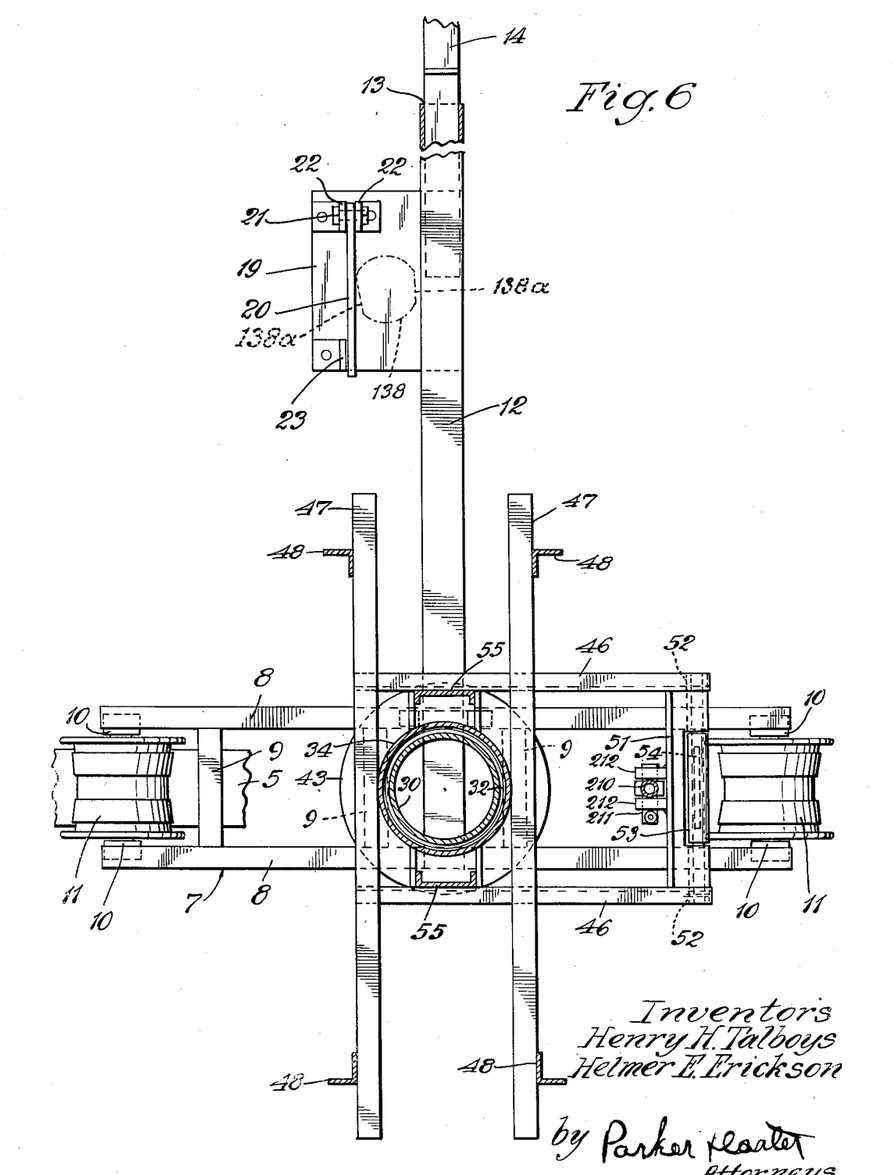
Figure 6 is a section on the line 6—6 of Figure 4.

When it is desired to move the hammer structure along the track to or from a place of use, the parts may be swung into the position in which they are shown in Fig. 2. In that event, after releasing the member 54, the superstructure is swung about its vertical pivot until the anvil guide 138 is aligned with the platform 19. The lock 20 is then dropped into the position in which it is shown in Fig. 6 and the anvil guide serves as means for locking the entire structure against rotation. It will be noted as in Fig. 6 that the opposite sides of the anvil guide 138 may be flattened as at 138a. This may be a convenience both in connection with locking the parts in the position of Fig. 2 and in connection with positioning the anvil guide in relation to the side of the top flange of the rail.

It will be realized that, whereas, we have described and illustrated a practical and operative device, nevertheless many changes may be made in the size, shape, number and disposition of parts without departing from the spirit of the invention. Therefore the description and drawings are to be taken as in a broad sense illustrative or diagrammatic, rather than as limiting to the precise showing.

Figure 1:
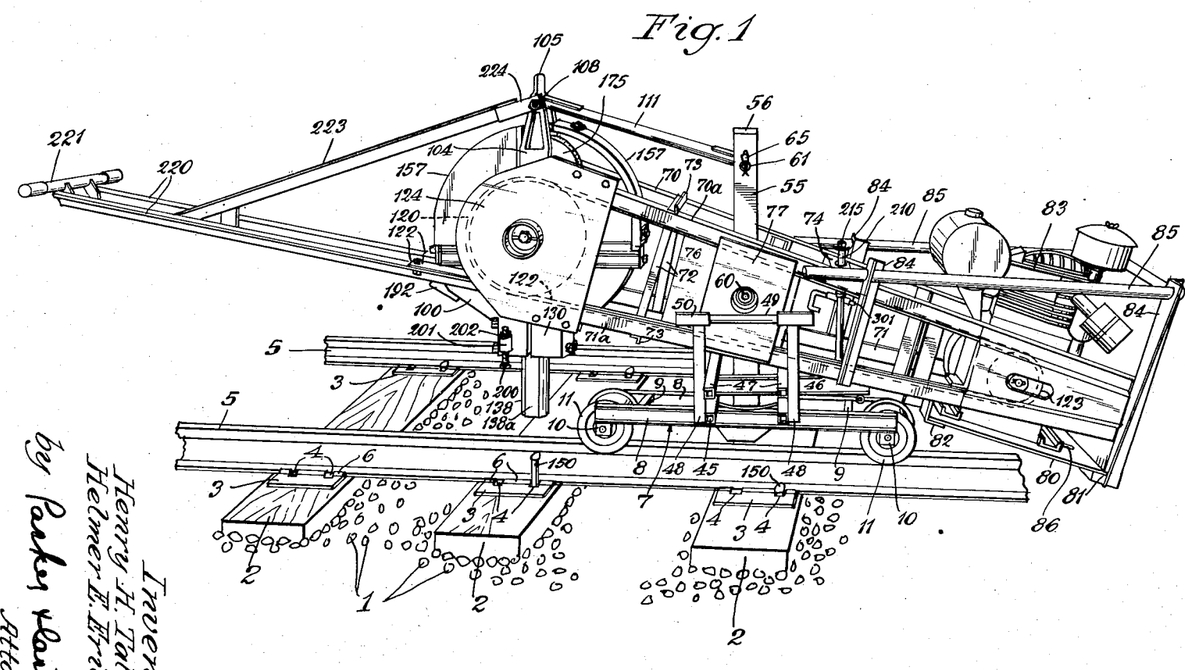
Figure 1 is a perspective view.

The use and operation of the invention are as follows:

A spike driving structure is provided which includes no spike feeding means, but which is best adapted for use with other means for holding the spikes in position to be driven. However, it will be understood that if desired suitable spike feeding means may be employed. Assume that a spike is held in proper position to be driven, as shown for example in Fig. 1. The boom is shown, in Fig. 1 in the position of rest, with the weight of the engine end of the boom holding the hammer end of the boom upwardly away from the spike. The user thrusts downwardly on the handle 221. The result of his downward thrust is to seat the spike head 150 in the socket or depression 140, which aligns the anvil with the spike. If desired the lower end of the anvil may be concaved, as at 149. When the bottom of the anvil strikes the head 150 of the spike its further downward movement is temporarily arrested. However, the guide 138 and the entire hammer structure, are moved downwardly. It will be understood that the hammer shaft 115 is rotated at a predetermined desired speed of rotation, and that the hammer member 180 is centrifugally held in outward position, as shown in Fig. 8. A continued downward movement of the hammer structure depresses the path of movement of the hammer until it intersects the inclined face 153 of the anvil. A blow is struck and the anvil is driven downward and in turn the spike is driven into the tie, and the hammer passes on beyond the anvil and returns to strike a succession of blows, as long as the operator thrusts downwardly on the handle 221. The result is a rapid driving of the spike. The downward movement of the structure may be limited by one of the adjustable stops 200, which may engage the top of the rail. Or it may be locked against downward movement by the relation between the adjustable stop 215 and the cross bar 74, as shown in Fig. 4. Or any other suitable limiting means may be employed, it being desirable that the anvil guide be unable to be thrust downwardly against the lower flange of the rail, or against the tie plate 3. Since one of the members 200 is mounted at each side of the anvil guide 138, as shown in Fig. 7 the device may be used with equal facility at each side of the track rail.

It will be understood that more than the one hammer 180 might be employed and that the details of the hammer rotor may be widely varied. However, it is desirable to employ a single hammer as shown in Fig. 8 balanced by a single counterweight 175, which is readily adjustable, as to weight, by filling the pockets 177. The counterweight is held against movement in relation to the rotor, for example by the pin 176. The hammer 180 is reversible, since two slots 181 and 182 are provided. The anvil structure is also reversible, and has two opposite faces 152 and 153. The members 136 and 137, of the anvil guide, may be adjusted, in order to adapt them to proper relationship to the amplitude of movement of the anvil structure. It is advisable to employ identical pins 165, 166 for both hammer and counterweight.

In moving the device toward or away from the place of use, the boom structure can be locked in the transverse position in which it is shown in Fig. 2 or locked parallel to the rail member 54 shown in dotted line position in Fig. 4.

Secured to the limit member 210 as will appear in Fig. 4, is a sleeve 300 in which is rotatable and slidably movable a stop member having a branch 301, and an angular projection 302 terminating in a recurved portion 303. The member 301 is normally in the dotted line position in which it is shown in Fig. 4. When the right end of the boom is depressed by the weight of the engine, or manually, the operator can swing the member into the full line position of Fig. 4 and the end portion 303 can be slid over the top of the cross piece 74, thus locking the boom in inoperative position, with the hammer end of the boom held upwardly removed from the track. This may be advantageous for example when starting the engine, or moving to or from the place of work.

We claim:

1. For use in a spike driving machine having a turntable support movable along the rails of a track, a hammer structure including a turntable element and a hammer support rotatable with the turntable element, said hammer support being also rotatable in relation to the turntable element about a generally horizontal axis, a hammer assembly at one end of the hammer support and a prime mover at the other end of the hammer support, the hammer assembly including an anvil guide normally fixed in relation to the hammer support, an anvil movable generally vertically in the guide, through a limited excursion, and a hammer rotor having mounted thereon an eccentrically and loosely pivoted hammer member, a driving connection between the hammer rotor and the prime mover, the anvil, when resting at its lower end upon a spike to be driven, having an upper portion extending into the path of the hammer member, as the hammer member rotates with the rotor, and having an extended bottom surface formed and adapted to engage and seat upon the top of a spike.

2. The structure of claim 1 characterized by said anvil guide having a lower portion extending downwardly below the lower end of the anvil and adapted thereby to surround and center the spike head in relation to said anvil.

3. The structure of claim 1 characterized by said anvil guide having an anvil portion through which the anvil extends, the anvil and the guide aperture through which it extends being formed to prevent rotation of the anvil.

4. The structure of claim 1 characterized by and including the employment of means for limiting the endwise movement of said anvil in said anvil guide to a predetermined extent.

5. The structure of claim 1 characterized by and including the employment of independently adjustable limit means for each end of the movement of the anvil in the anvil guide.

6. The structure of claim 1 characterized by said anvil having an inclined top face opposed to the hammer member, whereby the contact of the hammer member is effective to urge the anvil downwardly toward the spike upon which its lower end rests.

7. For use in a spike driving machine for rail spikes having a base movable along a track, a hammer assembly adapted to be movably mounted on said base, said assembly including a hammer support, a hammer mounted in said support for rotation about a generally horizontal axis, means for rotating said hammer, a downwardly extending anvil guide on said support, normally fixed in relation to the path of movement of said hammer, an anvil in said guide, mounted for a longitudinal movement of predetermined limitation, said anvil, when the hammer assembly and guide are raised to non-working position, being gravitally withdrawn from the path of movement of said hammer.

8. The structure of claim 7 characterized by and including means, adapted to engage the track, for limiting the downward movement of said hammer assembly in relation to said track.

9. The structure of claim 7 characterized by and including means located at each side of said guide, for limiting the downward movement of said hammer assembly in relation to the rail of a track.

10. The structure of claim 7 characterized by and including the employment of adjustable means, adapted to engage the top of a rail, for limiting the downward movement of the hammer assembly in relation to the track.

11. In a spike driving machine for rail spikes, a base with supporting wheels movable along a track, a boom mounted on said base for rotation about vertical and horizontal axes, a spike hammer mounted on said boom adjacent an end thereof, and means for actuating it, and means for locking said boom in a non-operative position, in which the boom extends transversely of the track and across the base.

12. For use in a spike driving machine for rail spikes having a carriage with supporting wheels movable along the rails of a track, and including a longitudinal component aligned with one rail of a track and a transverse component extending from the longitudinal component to the opposite rail, a boom mounted on said base for rotation about a vertical axis aligned generally with the rail beneath said longitudinal carriage component, said boom being mounted for rotation about a generally horizontal axis, a motor mounted on said boom adjacent one end thereof, a hammer assembly mounted on said boom at the opposite side of said horizontal axis, said hammer assembly including a rotary hammer and a driving connection between said hammer and motor, and further including an anvil guide and an anvil mounted for limited longitudinal movement within said guide, said motor end of the boom being of sufficient weight to hold the hammer assembly normally upwardly withdrawn from the track, and means for moving the hammer end of the boom downwardly, and for thereby engaging said anvil with a spike to be driven.

13. For use in a spike driving machine for rail spikes having a carriage movable along the rails of a track, a turntable structure on said carriage, a boom mounted on said turntable structure for rotation about a generally horizontal axis, a hammer assembly on one end of said boom, including a hammer mounted for rotation about a generally horizontal axis, a motor on the opposite end of said boom, flexible endless driving means extending between said motor and hammer, said boom including longitudinal extending structural members formed and adapted to serve as guards for said driving means.

14. The structure of claim 1 characterized by said anvil having an inclined top face opposed to the hammer member, whereby the contact of the hammer member is effective to urge the anvil downwardly toward the spike upon which its lower end rests, said top face having two portions angularly inclined to each other and converging generally midway of the width of the anvil, the anvil being reversible, about its vertical axis, whereby said inclined portions may selectively be opposed to the hammer.

HENRY H. TALBOYS.
HELMER E. ERICKSON.

REFERENCES CITED

The following references are of record in the file of this patent:

UNITED STATES PATENTS

| Number | Name | Date |
|---|---|---|
| 544,040 | Janda | Aug. 6, 1895 |
| 809,348 | Weston | Jan. 9, 1906 |
| 928,783 | Mosher | July 20, 1909 |
| 976,513 | Smith | Nov. 22, 1910 |
| 1,284,815 | Taylor | Nov. 22, 1918 |
| 1,699,519 | Brown | Jan. 22, 1929 |
| 1,735,306 | Voit | Nov. 12, 1929 |
| 1,808,452 | Cousins | June 2, 1931 |
| 1,856,673 | Valdez | May 3, 1932 |
| 1,856,893 | Talboys | May 3, 1932 |
| 1,906,109 | Schmidt | Apr. 25, 1933 |
| 1,908,959 | Cullen et al. | May 16, 1933 |
| 2,018,129 | Jackson | Oct. 22, 1935 |

FOREIGN PATENTS

| Number | Country | Date |
|---|---|---|
| 294,414 | Great Britain | July 26, 1928 |